United States Patent
Yoon et al.

(10) Patent No.: US 9,024,799 B2
(45) Date of Patent: May 5, 2015

(54) DATA TRANSMISSION APPARATUS AND METHOD THEREOF AND DATA RECEPTION APPARATUS AND METHOD THEREOF

(75) Inventors: Hyung-min Yoon, Seoul (KR); Chang-kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 13/481,510

(22) Filed: May 25, 2012

(65) Prior Publication Data

US 2012/0230436 A1    Sep. 13, 2012

Related U.S. Application Data

(62) Division of application No. 12/566,397, filed on Sep. 24, 2009, now Pat. No. 8,576,107.

(30) Foreign Application Priority Data

Oct. 29, 2008    (KR) .................. 10-2008-0106662

(51) Int. Cl.
*H04L 17/02*    (2006.01)
*G06F 17/30*    (2006.01)

(52) U.S. Cl.
CPC .............................. *G06F 17/30876* (2013.01)

(58) Field of Classification Search
USPC ............. 235/472.02, 472.01, 472.03, 462.45, 235/426.46; 341/175, 176
See application file for complete search history.

(56) References Cited

U.S. PATENT DOCUMENTS

| | | | | |
|---|---|---|---|---|
| 5,952,943 A | * | 9/1999 | Walsh et al. | 341/50 |
| 6,166,664 A | * | 12/2000 | Acharya | 341/63 |
| 7,124,953 B2 | * | 10/2006 | Anttila et al. | 235/472.02 |
| 7,561,073 B2 | * | 7/2009 | Irvine et al. | 341/50 |
| 7,575,168 B2 | * | 8/2009 | Suomela et al. | 235/462.01 |
| 7,734,105 B2 | * | 6/2010 | Strom et al. | 382/239 |
| 2005/0240871 A1 | * | 10/2005 | Wilson | 715/700 |
| 2006/0071077 A1 | * | 4/2006 | Suomela et al. | 235/462.01 |
| 2010/0020970 A1 | * | 1/2010 | Liu et al. | 380/255 |
| 2010/0225580 A1 | * | 9/2010 | Yoon et al. | 345/157 |

FOREIGN PATENT DOCUMENTS

| | | |
|---|---|---|
| JP | 2007-034625 A | 2/2007 |
| KR | 10-2007-0015162 | 2/2007 |
| KR | 10-2007-0020337 | 2/2007 |
| KR | 10-2007-0067181 A | 6/2007 |
| KR | 10-2007-0102180 | 10/2007 |
| KR | 10-2007-0122129 | 12/2007 |

* cited by examiner

*Primary Examiner* — Linh Nguyen
(74) *Attorney, Agent, or Firm* — NSIP Law

(57) ABSTRACT

Data transmission apparatus and method thereof, and data reception apparatus and method thereof. Input data is encoded into a plurality of visual codes according to a visual code type. The visual code type includes a sequential type requiring sequential transmission and a nonsequential type not requiring sequential transmission. The sequential visual code includes start code, data code, and end code, and is displayed sequentially. The nonsequential visual code is displayed nonsequentially.

7 Claims, 9 Drawing Sheets

DATA TRANSMISSION APPARATUS AND METHOD THEREOF AND DATA RECEPTION APPARATUS AND METHOD THEREOF

CROSS-REFERENCE TO RELATED APPLICATION(S)

This application is a divisional of U.S. patent application Ser. No. 12/566,397, filed on Sep. 24, 2009 now U.S. Pat. No. 8,576,107, which claims the benefit under 35 USC §119(a) of Korean Patent Application No. 10-2008-0106662, filed on Oct. 29, 2008, the entire disclosures of which are incorporated herein by reference for all purposes.

BACKGROUND

1. Field

The following description relates to a data transmission and reception system, and more particularly, to a data transmission apparatus and method thereof, and a data reception apparatus and method thereof using visual codes.

2. Description of the Related Art

Mobile devices such as mobile telephones, personal digital assistants (PDAs), portable multimedia players (PMPs), motion picture experts group (MPEG) audio layer-3 (MP3) players, and digital cameras are widely used. Such mobile devices may include various built-in devices with additional functions such as cameras, high-capacity data storage units, and multimedia data inquiry devices. Also, services that display code images on a screen of such mobile devices, and use the code images to perform coupon authentication, user authentication, security, and the like, have been introduced. Code images may include barcodes, two-dimensional (2D) codes, color codes, and the like.

SUMMARY

One general aspect includes a data transmission apparatus including an encoder to divide input data and encoding the divided data into a plurality of visual codes according to a visual code type depending on a visual code transmission technique, and a display to display each of the plurality of visual code images during at least a minimum expression time to allow the plurality of visual code images to be captured by a data reception apparatus.

The visual code type may include sequential visual code to perform sequential transmission and nonsequential visual code to perform transmission which is not sequential.

The encoder may divide data based on data size that can be encoded into visual codes according to visual code type.

Also, the encoder may generate the visual codes to include a start code to identify a start of the encoded data sequential visual codes, a data code to transmit data, and an end code to identify an end of the encoded data, and the respective sequential visual codes may include type recognition information to identify them as a sequential type.

The start code may include code classification information to identify it as a start code, and total code number information to identify the total number of visual codes used in transmitting the data. The data code may include encoded data, code classification information to identify it as a data code, and code number information to identify a number of a visual code out of the total code number. The end code may include code classification information to identify it as an end code, and total code number information to identify an amount of the total code which has been transmitted.

The display may sequentially display the sequential visual codes in a set order.

Where the encoder generates nonsequential visual codes, the encoder may generate the nonsequential visual code to include type recognition information to identify each nonsequential visual code as a nonsequential type, and meta-information including data location information to identify which region among the data the divided data belongs to.

The display may display the nonsequential visual codes regardless of sequence.

According to another general aspect, there is provided a data reception apparatus including a code capturer to capture visual codes that are each displayed during at least a minimum expression time and respectively correspond to divided data parts, and a decoder to restore data by decoding each visual code, check visual code type, extract a data part included in each visual code according to the checked visual code type, and combine the extracted data parts.

Where the visual codes include type recognition information to identify them as a sequential type, the decoder may restore data using start code to identify a start of the encoded data, data code to transmit data, and end code to identify an end of the encoded data.

The start code may include code classification information to identify it as a start code, and total code number information to identify a total number of visual codes used in transmitting the data, the data code may include encoded data, code classification information to identify it as is a data code, and code number information to identify a number of a visual code out of the total code number, and the end code may include code classification information to identify it as an end code, and total code number information to identify an amount of the total code which has been transmitted.

Where the visual codes include type recognition information to identify the visual codes as a nonsequential type, the decoder may restore data using meta-information comprising data location information to identify a region the divided data belongs to from among the data.

According to still another general aspect, there is provided a data transmission method including dividing input data and encoding the divided data into a plurality of visual code images according to a visual code type depending on a visual code transmission technique, and displaying each of the plurality of visual code images during at least a minimum expression time to allow the plurality of visual code images to be captured by a data reception apparatus.

The visual code type may include sequential visual code to perform sequential transmission, and nonsequential visual code to perform transmission which is not sequential.

The encoding of the divided data may include generating a start code to identify a start of the encoded data, a data code to transmit data, and an end code to identify an end of the encoded data, as the sequential visual codes, the sequential visual codes comprise type recognition information identifying them as a sequential type, and the displaying of each of the plurality of visual code images may include displaying the sequential visual codes in a set order.

The start code may include code classification information to identify it as a start code, and total code number information to identify the total number of visual codes used in transmitting the data, the data code may include encoded data, code classification information to identify it as a data code, and code number information to identify a number of a visual code out of the total code number, and the end code may include code classification information to is identify it as an end code, and total code number information to identify an amount of the total code which has been transmitted.

The encoding of the divided data may include generating nonsequential visual codes to include type recognition information identifying them as a nonsequential type, and meta-information including data location information to identify a region the divided data belongs to from among the data, and the displaying of each of the plurality of visual code images may include displaying the nonsequential visual codes regardless of order.

According to yet another general aspect, there is provided a data reception method including capturing one or more visual codes that are each displayed during at least a minimum expression time and respectively correspond to divided data parts; and restoring data by decoding the one or more visual codes, and extracting and combining divided data parts included in the one or more visual codes according to visual code type.

Where the visual codes include type recognition information to identify the visual codes as a sequential type, the restoring of the data may include restoring the data using start code to identify a start of the encoded data, data code to transmit data, and end code to identify an end of the encoded data.

Where the visual codes include type recognition information to identify the visual codes as a nonsequential type, the restoring of the data may include restoring the data using data meta-information including data location information to identify a region the divided data belongs to from among the data.

Other features and aspects will be apparent from the following detailed description, the drawings, and the claims.

(MP3) file structure.

Figure 5A:
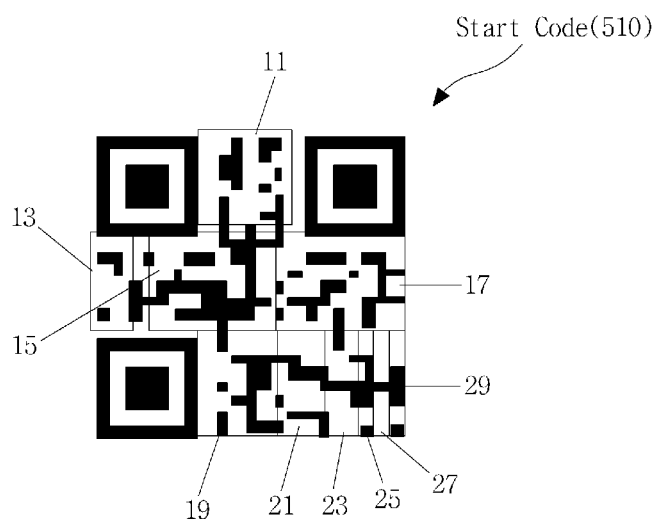
Figure 5B:
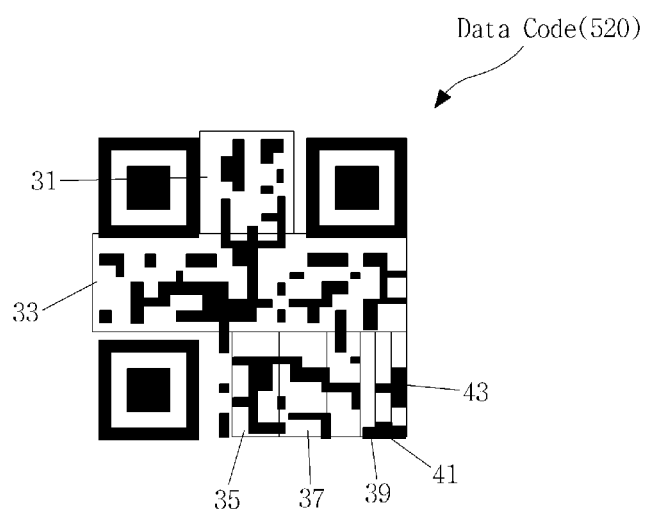
Figure 5C:
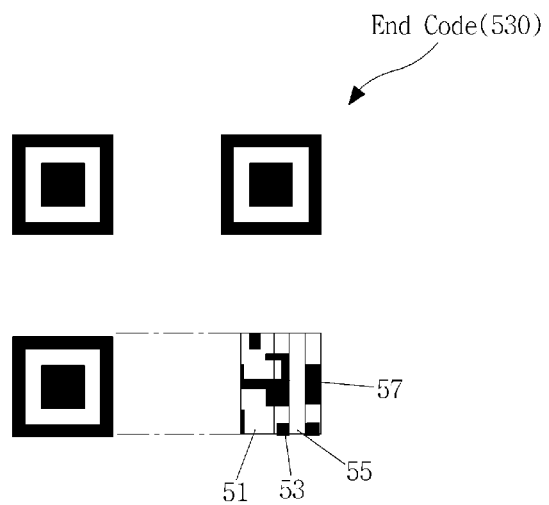

FIGS. 5A through 5C are diagrams respectively illustrating an exemplary start code, an exemplary data code, and an exemplary end code of a sequential code.

Figure 6A:
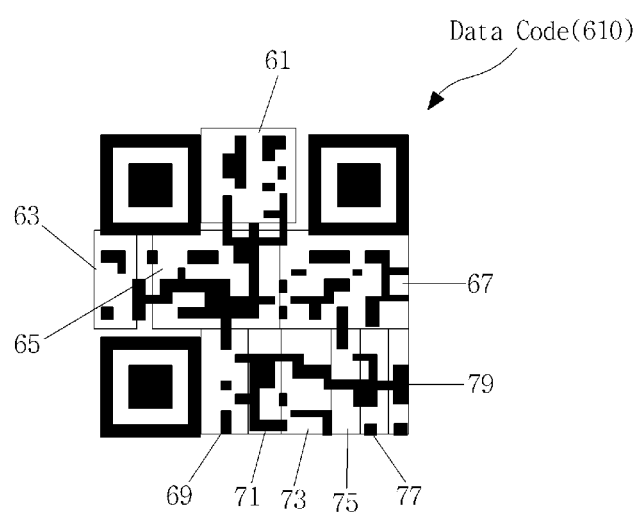
Figure 6B:
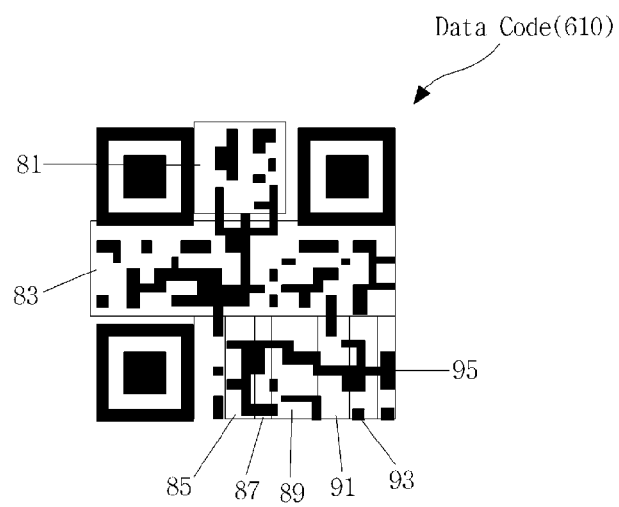

FIGS. 6A through 6B are diagrams respectively illustrating exemplary data codes of nonsequential code.

Figure 7:
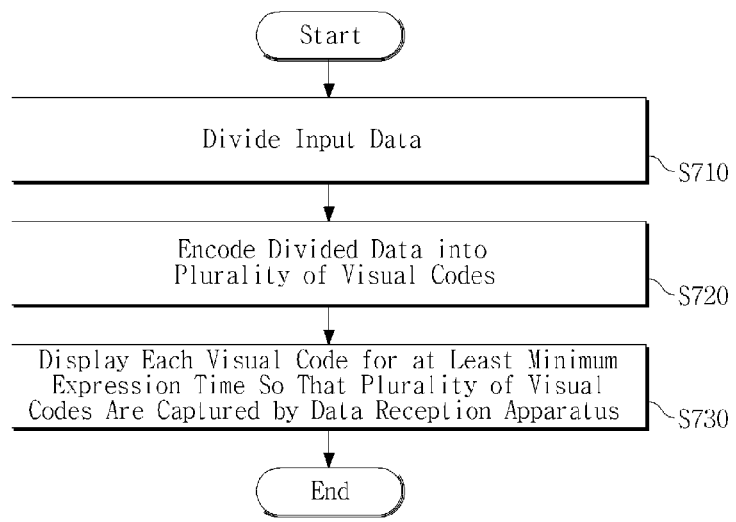

FIG. 7 is a flowchart illustrating an exemplary data transmission method.

Figure 8:
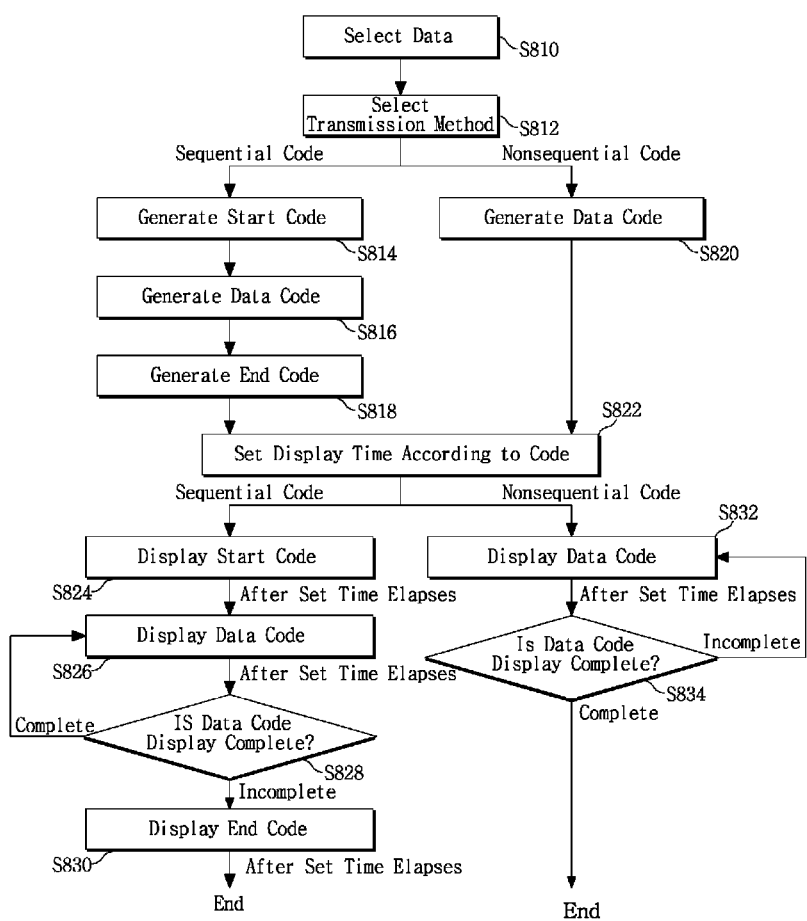

FIG. 8 is a flowchart illustrating an exemplary data transmission method.

Figure 9:
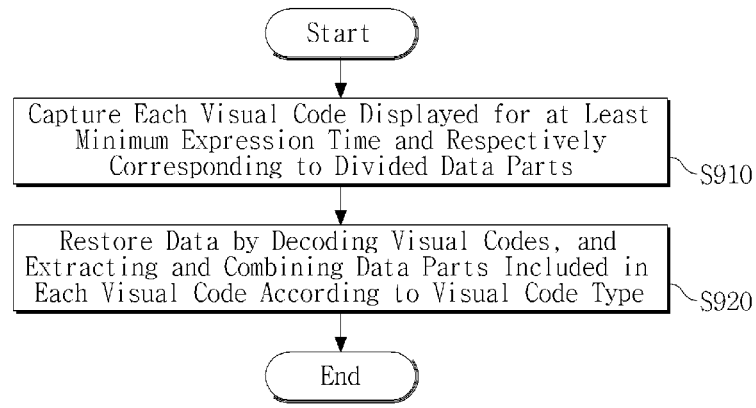

FIG. 9 is a flowchart illustrating an exemplary data reception method.

Figure 10:
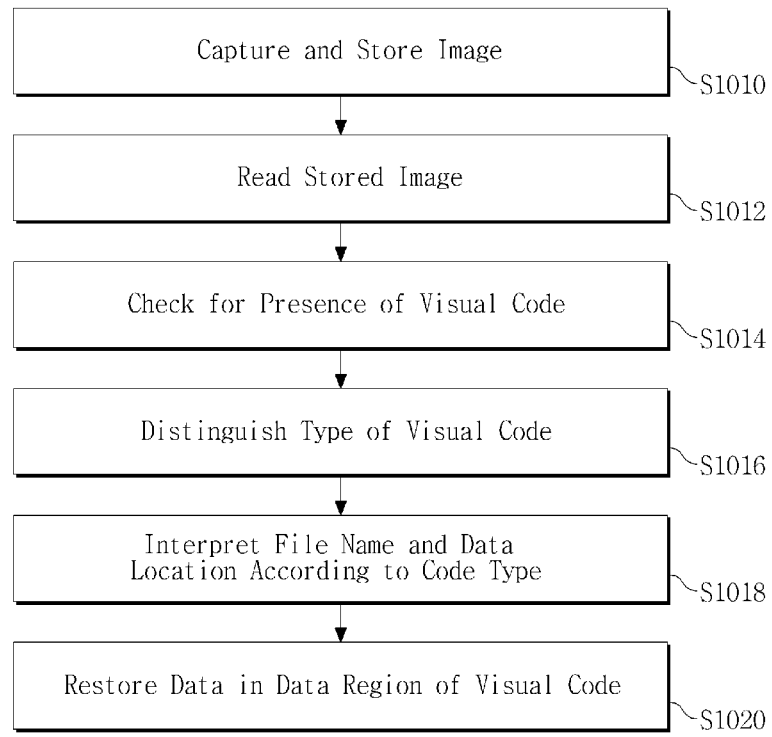

FIG. 10 is a flowchart illustrating an exemplary data reception method.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
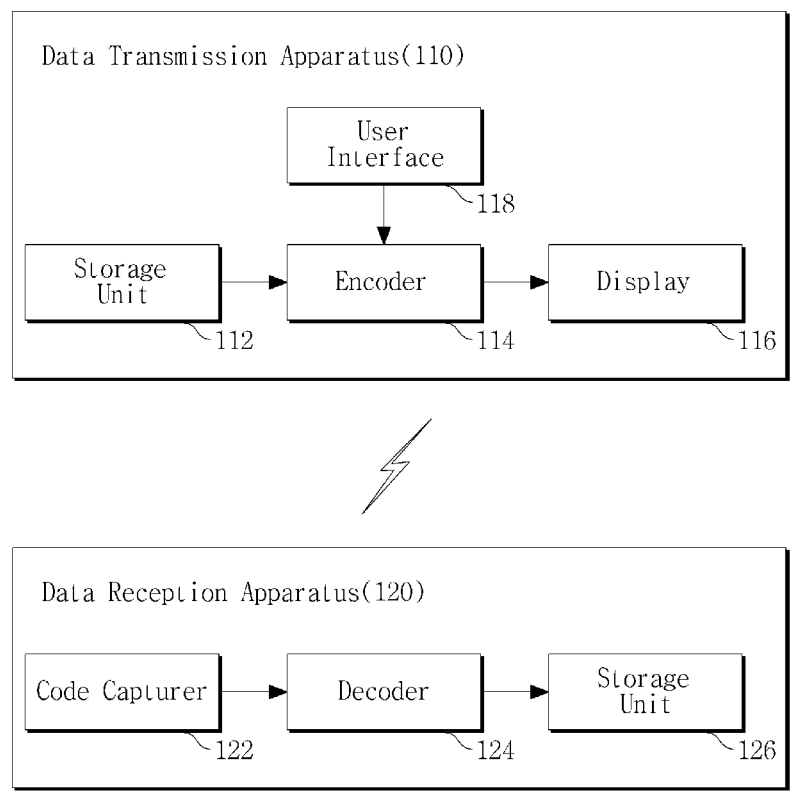
FIG. 1 is a block diagram illustrating exemplary structures of a data transmission apparatus and a data reception apparatus, respectively.

FIG. 1 is a block diagram illustrating exemplary structures of a data transmission apparatus and a data reception apparatus, respectively.

A data transmission apparatus 110 includes a storage unit 112, an encoder 114, a display 116, and a user interface 118. A data reception apparatus 120 includes a code capturer 122, a decoder 124, and a storage unit 126.

The data transmission apparatus 110 performs functions of dividing data and encoding the divided data into a plurality of visual codes, and displaying the encoded visual codes as images. The data reception apparatus 120 restores data transmitted using the plurality of visual codes by capturing and decoding the visual codes displayed on the data transmission apparatus 110. The data transmission apparatus 110 and the data reception apparatus 120 may be embodied in various electronic devices including mobile devices such as mobile telephones, personal digital assistants (PDAs), portable multimedia players (PMPs), motion picture experts group (MPEG) audio layer-3 (MP3) players, and digital cameras, as well as large display devices such as televisions (TVs) including cameras, etc.

The transmitted and received data may include audio, video, text or various multimedia data or files. Furthermore, no restrictions exist regarding a format and/or type of the transmitted and received data, where the data can be encoded into visual code. The visual code may be one-dimensional barcode, two-dimensional code, or moving picture code, and a type of the code is not restricted. The two-dimensional code may be, for example, quick response (QR) code, matrix code, maxi code, or color code.

Structures of the data transmission apparatus 110 followed by the data reception apparatus 120 will be described in detail below.

In order to perform code transmission, the encoder 114 encodes data input from the storage unit 112 or from an outside source into a plurality of visual codes, and the display 116 displays the encoded visual codes. The encoder 114 divides data to be transmitted according to data size that can be encoded into each visual code, and encodes the divided data into each visual code.

Also, the encoder 114 may receive at least one data from the storage unit 112 to encode the at least one data into one visual code. The visual code type may include sequential visual code to perform a sequential transmission and nonsequential visual code to perform transmission which is not sequential.

Hereinafter, a process of generating sequential visual codes will be described.

Figure 2A:
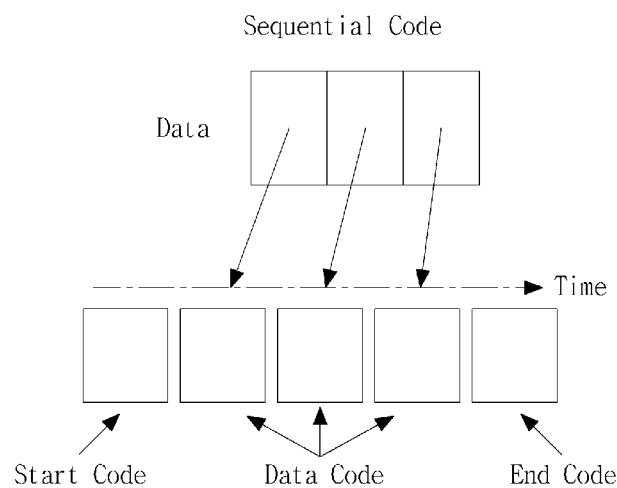
FIGS. 2A and 2B are diagrams respectively illustrating an exemplary sequential visual code and an exemplary nonsequential visual code.

The encoder 114 may generate the visual codes to include start code identifying a start of data encoded into sequential visual code, data code transmitting data, and end code identifying an end of encoded data. Each sequential visual code may include type recognition information identifying it as the sequential type. FIG. 2A is a diagram illustrating an exemplary process of encoding sequential visual code. In FIG. 2A, the visual code is illustrated as an empty block, however, as described above, the visual code may include various types of image code.

The start code may include code type information identifying it as a start code, and total code number information about how many visual codes are used in total in data transmission. The data code may include encoded data, code classification information identifying it as a data code, and code number information identifying a number of a visual code out of the total code number. The end code may include code classification information identifying it as an end code, and total code number information identifying how many of the total code have been transmitted.

The display 116 periodically displays code images of the sequential visual codes for a specific time in a preset order, that is, the order of start code, data code, and end code. For example, where 200 ms passes, a next sequential visual code in the sequence may be displayed.

The sequential visual code includes the start code, the ordered data code, and the end code, and an order of capture and decoding is important during recognition using a camera of the data reception apparatus 120. For example, in response to a captured image containing the start code being lost, corresponding data may not be received at all.

The encoder 114 may encode divided data parts of each of at least one data into one visual code. For example, the start code of data A, the data code of data B and the end code of data C may be encoded into a visual code displayed on the display 116 at time t.

Next, a process of generating nonsequential visual code will be described with reference to FIG. 1.

Figure 2B:
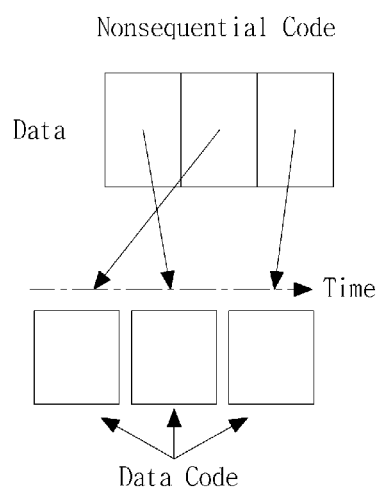

The encoder 114 may divide data and generate nonsequential visual codes to include the divided data parts and meta-information regarding data including information on the divided parts (or regions). FIG. 2B is a diagram showing nonsequential visual code according to an exemplary embodiment. In the case of a nonsequential code technique, each data block is expressed in one code regardless of order and without code identifying a start or end.

The encoder 114 may generate the nonsequential visual code to include type recognition information identifying each nonsequential visual code as the nonsequential type, and meta-information including data location information identifying which region data belongs to among data transmitted by display of the divided data parts. The meta-information may further include data name (file name), type, size, etc.

Since the nonsequential code contains information about which region data encoded in each code belongs to among all data, the display 116 may display code images without regard to their order. Since there is simply a minimum expression time, one code image is displayed for the minimum expression time or more.

Meanwhile, the encoder 114 may encode divided data of each of at least one data into one nonsequential visual code. For example, the data code of data D, the data code of data E, and the data code of data F may be included in one nonsequential visual code displayed at time t.

Where a reading of a nonsequential tag with no order is impossible, only a data code that is unreadable is lost. Here, various error correction and restoration methods such as capturing the lost data code in a camera of the data reception apparatus 120 by repeatedly displaying it, or restoring the lost data code in the data reception apparatus 120 by adding an error block to the displayed visual code, may be used together to increase data transmission success rate.

The structure of the data reception apparatus 120 will now be described in detail with reference to FIG. 1.

For code reception, the code capturer 122 may include an image capture device, for example, a camera, control an image capture operation of the camera, and extract an image containing a code. The extracted image is transmitted to the decoder 124, restored into data, and stored in the storage unit 126.

The code capturer 122 sets a fixed time to periodically capture images. The code capturer 122 captures code images during a fixed short time where code is contained in a captured image. The code capturer 122 captures visual codes that are each displayed during at least a minimum expression time and that respectively correspond to divided data parts. Where start code symbolizing the start of data is contained in a captured image, visual code continuously which displayed during a set time is captured.

The decoder 124 interprets captured code images. The decoder 124 restores data by decoding each visual code, checking visual code type, and combining respective visual codes according to their checked visual code type.

Where the visual codes include type recognition information identifying them as the sequential type and thus are distinguished as sequential code, the decoder 124 checks whether the data transmission start code and end code have been transmitted, and where the visual code is data code, checks the data code number information. The data is restored by interpreting the visual codes expressing the data, and extracting and combining data parts included in the visual codes.

Where the visual codes include type recognition information which identifies the visual as the nonsequential type, and thus are distinguished as nonsequential code, the decoder 124 interprets the captured data code to extract the data, restores the extracted data, and stores it in the storage unit 126. The decoder 124 may restore the data using meta-data including data location information identifying which region of data is transferred within one data file.

Every time a visual code is decoded, the decoder 124 stores it in a storage space of the storage unit 126. Where all the divided data information is decoded using total code number information or code number information, the decoder 124 combines and stores the restored data. The decoder 124 may create a storage space, for example, a folder, according to a file name included in the visual code and may store the restored data. That is, by storing restored data in a storage space of the storage unit 126 corresponding to data recovered from currently decoded visual code, for example, a folder having a file name included in the currently decoded visual code, data having the same file name is gathered and stored. The stored data may be output to an output device (not illustrated) such as a display, or an audio output device, according to its data format.

According to one exemplary aspect, a series of code produced by encoding data may be displayed using a display of various digital equipment, and the code may be recognized in equipment furnished with a camera, to allow a large amount of data to be transmitted without using a method such as wireless telecommunication. Accordingly, it may become possible to exchange data between devices not equipped with means of wireless telecommunication. For example, even without means of wireless telecommunication such as Bluetooth, wireless fidelity (WiFi), etc., data can be transmitted and received between one device and another device through optical telecommunication. Also, to employ existing wired and wireless telecommunication, user intervention is required to set up a communication connection, for example, to set up a communication channel connection, to set up peripherals to be connected, to check and control the connection, etc. However, according to an exemplary embodiment, data transmission and reception can be accomplished with minimal user intervention.

An example of an MP3 file data which is encoded into QR code will now be described.

Figure 3:
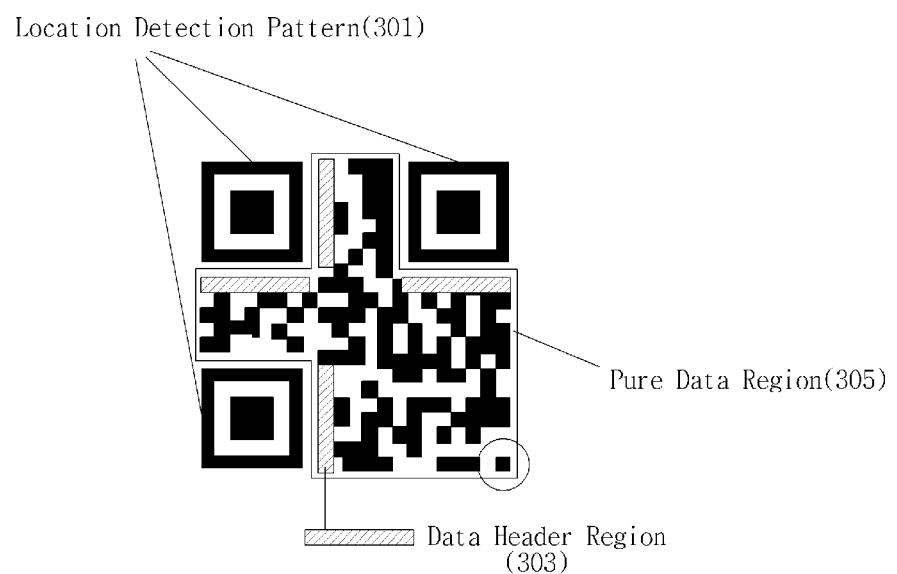
FIG. 3 is a diagram illustrating a quick response (QR) code.

FIG. 3 is a diagram illustrating QR code.

QR code includes a location detection pattern 301 and a pure data region 305. A data header region 303 is included in the data region 305. Information such as code version information and error code level is included in the data header region 303.

Figure 4:
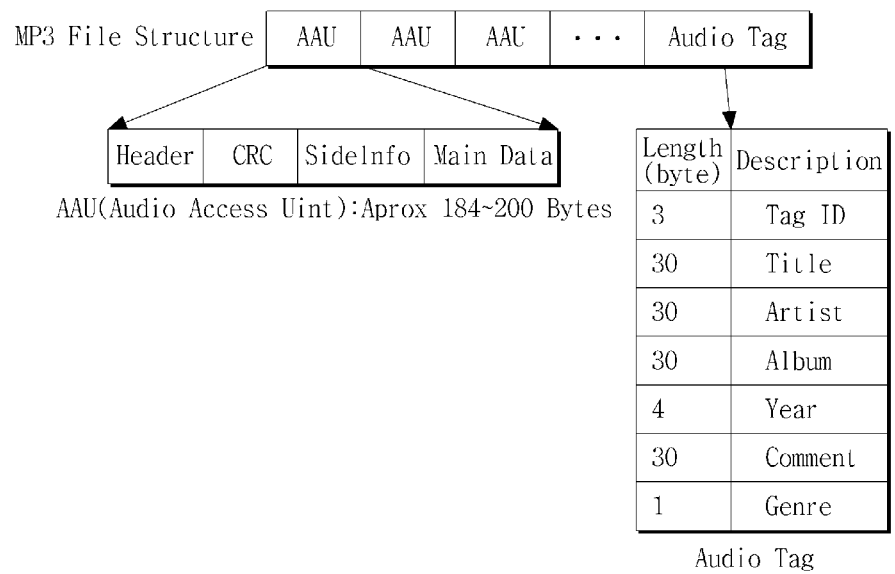
FIG. 4 is a diagram illustrating a motion picture experts group (MPEG) audio layer-3

FIG. 4 is a diagram illustrating an MP3 file structure.

An MP3 file includes a plurality of audio access units (AAUs) and an audio tag which is meta-information of the MP3 file. Each AAU includes a header, cyclic redundancy check (CRC), Side Info, and main data. The audio tag includes Tag ID, Title, Artist, Album, Year, Comment, and genre information.

FIGS. 5A through 5C are diagrams respectively illustrating start code, data code, and end code of sequential code according to an exemplary embodiment.

FIG. 5A illustrates an exemplary start code of a sequential code using QR code format. According to FIG. 5A, start code 510 is divided into a plurality of data regions and includes each of information 11, 13, 15, 17, 19, and 21 which are included in the Tag ID of an MP3 file, and file name 23, total code number 25, code classification 27, and code type 29 information.

In FIG. 5A, information 11 may be encoded to represent Comment, information 13—Year, information 15—Album, information 17—Artist, information 19—Title, and information 21—TagID. Also, for example, file name 21 may indicate 01.mp3, total code number 25 may express a number saying that 188 data codes are sent, e.g., 10111100 (1 byte), code classification 27 may express a number to identify the start code as start code, e.g., 00010000 (1 byte), and code type 29 may express a number to identify the code type as sequential code, e.g., 10111000 (1 byte).

FIG. 5B illustrates exemplary data code of a sequential code using QR code format. According to the exemplary embodiment, data code 520 includes each of information 31, 33, 35, and 37 including an AAU, and code number 39, code classification 41, and code type 43 information.

In FIG. 5B, information 31 may be encoded to represent Side Info, information 33—main data, information 35—header, and information 37—CRC. Also, for example, code number 39 may express a number 10000000 (1 byte) meaning that a $128^{th}$ data code is sent, code classification 41 may express a number to identify the data code as data code, e.g., 10010000 (1 byte), and code 43 may express a number to identify the code as sequential code, e.g., 10111000 (1 byte).

FIG. 5C illustrates exemplary end code of a sequential code using QR code format. According to the exemplary embodiment, in end code 530, for example, file name 51 may express a number expressing 01.mp3, total code number 53 may express a number 10111100 (1 byte) signifying that 188 data codes have been sent, code classification 55 may express a number to identify the end code as end code, e.g., 00000000 (1 byte), and code type 57 may express a number to identify the code as sequential code, e.g., 10111000 (1 byte).

FIGS. 6A through 6B are diagrams respectively illustrating exemplary data code of a nonsequential code.

FIG. 6A illustrates an exemplary data code of a nonsequential code using QR code format. Start code 610 is divided into a plurality of data regions and includes each of information 61, 63, 65, 67, 69, and 71 which are included in Tag ID, and file name 73, total code number 75, code classification 77, and code type 79 information.

In FIG. 6A, information 61 may be encoded to represent Comment, information 63—Year, information 65—Album, information 67—Artist, information 69—Title, and information 71—TagID. Also, for example, file name 73 may be a number representing 01.mp3, data location 75 may identify $37052^{nd}$ data with a number 10010000 10111100 (2 bytes), total code number 77 may indicate a total of 37052 data codes with a number 10010000 10111100 (2 bytes), and code type 79 may express a number 10111010 (1 byte) to identify the code type as nonsequential code.

FIG. 6B illustrates exemplary data code of a nonsequential code using QR code format. According to the exemplary embodiment, data code 620 includes each of information 81, 83, 85, and 87 including an AAU, and file name 89, data location 91, total data code number 93, and code type 95 information.

In FIG. 6B, information 81 may be encoded to represent Side Info, information 83—main data, information 85—CRC, and information 87—header. Also, for example, file name 89 may express a number representing 01.mp3, data location 91 may indicate $12819^{th}$ data with a value of 0011001000010011 (2 bytes), total data code number 93 may express a total of 37052 data codes with a value of 10010000 10111100 (2 bytes), and code type 95 may express a number 10111010 (1 byte) to identify the code as nonsequential code.

FIG. 7 is a flowchart illustrating an exemplary data transmission method.

Input data is divided (S710), and the divided data is encoded into a plurality of visual codes according to a visual code transmission technique (S720).

The plurality of visual codes are each displayed during at least a minimum expression time in order to be continuously captured by the data reception apparatus (S730).

FIG. 8 is a flowchart illustrating an exemplary data transmission method in detail.

An example of the data transmission method will now be described in detail with reference to FIGS. 1 and 8. Data to be transmitted, e.g., 01.mp3 file, is selected through the user interface 118 (S810). Where a transmission method is selected by a user input signal, a process of encoding the data into at least one visual code according to the data transmission method is initiated (S812).

For example, a process of encoding, for example, 01.mp3 file, into sequential code and transmitting it may be initiated using a set sequential code sending button (not illustrated) on the user interface 118. Then, the encoder 114 reads 01.mp3 file from the storage unit 112 and begins encoding.

The encoder 114, as illustrated in FIG. 5A, may generate start code including total code number, audio tag information, etc. (S814). The generated start code may be stored as, for example, Sequence0000.bmp to be used.

Also, the encoder 114, as illustrated in FIG. 5B, may generate data codes including AAUs which are data units of 01.mp3 file (S816). The generated data codes may be assigned code names according to their order of generation and stored as Sequence0001.bmp to SequenceXXXX.bmp.

Also, the encoder 114, as illustrated in FIG. 5C, may generate end code including 01.mp3 file name, total code information, etc. (S818). The generated end code may be assigned a number next to the number assigned to the last data code file name and stored as, for example, Sequence9999.bmp.

Then, the display 116 sets a display time corresponding to each visual code generated according to the code transmission technique (S820). Sequential visual code may be displayed in an order of start code, data code, and end code using, for example, the code generation order or order of stored code names. And, nonsequential visual code may be displayed regardless of any order.

The display 116 may read and display the encoded visual codes in turn during a specific time period, for example, 0.5 seconds. The display 116 first reads and displays start code Sequence0000.bmp on a screen (S824). Next, the display 116 reads and periodically displays data codes Sequence0001.bmp, Sequence0002.bmp, etc. in a predetermined order corresponding to file names on the screen (S826). Where a display of visual code images of data codes is completed (S828), the display 116 reads the last code, end code Sequence9999.bmp, displays the visual code images during the specific time, and ends the display operation (S830).

A user may select data, for example, 01.mp3 file (S810), and initiate a process of encoding 01.mp3 file into nonsequential code and transmitting it using a nonsequential code sending button (S812). Then, the encoder 114 reads 01.mp3 file from the storage unit 112 and begins encoding.

The encoder 114, as illustrated in FIGS. 6A and 6B, may generate code images including data codes including 01.mp3 file name, data number and Audio Tag of 01.mp3 file, AAU data units, etc. (S820). The visual codes may be stored by, for example, the code names Non-Sequence0001.bmp to Non-Sequence000x.bmp.

The display 116 sets display times of the nonsequential codes (S822), and displays the generated data codes during a set time period (S832). For example, the display 116 may read and display Non-Sequence0001.bmp on the screen during a specific time period, e.g., 0.5 seconds, then read and display Non-Sequence0002.bmp on the screen during the specific time period, and sequentially perform display in order of the number included in the code name. Where data code image display is completed (S834), the displaying of the Non-Sequence0001.bmp ends.

FIG. 9 is a flowchart illustrating and exemplary data reception method.

At least one visual code image which is displayed during at least a minimum expression time and which corresponds to a plurality of divided data parts is captured (S910)

The data is restored by decoding the at least one visual code image, checking the visual code type, and extracting and combining data parts included in each of the visual codes according to the checked visual code type (S920).

FIG. 10 is a flowchart illustrating an exemplary data reception method.

The capturer 122 periodically captures images and stores them as temp00xxx.bmp, etc. (S1010).

The decoder 124 reads the stored images (S1012). The decoder 124 finds code locations, and checks and/or searches the images to find visual code, for example, QR code (S1014).

Where a visual code exists in a read image, the decoder 124 reads code information and distinguishes the code type (S1016).

The decoder 124 interprets code classification information to interpret file name and data location according to code type (S1018), and restores, for example, an MP3 file including audio tag or AAU data existing in a data region (S1020).

Where the visual code is start code, the decoder 124 may decode and store it, and then capture, decode, and store a next image until end code is detected. Also, the decoder 124 may generate a file according to a file name included in the visual code, or open a file whose file name is included in current visual code if such a file already exists, and add or combine AAU data and audio tag to/with the generated file to store the file according to data location information, i.e., code number information.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data reception apparatus, comprising:
    a code capturer configured to capture visual codes that are each displayed during at least a minimum expression time and respectively correspond to divided data parts, wherein the visual codes comprise type recognition information to identify the visual codes as a sequential type or a nonsequential type; and
    a decoder configured to restore data by decoding each visual code, checking visual code type, and extracting a data part included in each visual code according to the checked visual code type, and combining the extracted data parts.

2. The apparatus of claim 1, wherein in response to the visual codes comprising type recognition information to identify the visual codes as a sequential type, the decoder restores data using a start code to identify a start of the encoded data, data codes to transmit data, and an end code to identify an end of the encoded data.

3. The apparatus of claim 2, wherein:
    the start code comprises code classification information to identify it as a start code, and total code number information to identify a total number of visual codes used in transmitting the data;
    each of the data codes comprises encoded data, code classification information to identify it as a data code, and code number information to identify a number of a visual code out of the total number of visual codes; and
    the end code comprises code classification information to identify it as an end code, and total code number information to identify an amount of the total codes which have been transmitted.

4. The apparatus of claim 1, wherein in response to the visual codes comprising type recognition information to identify the visual codes as a nonsequential type, the decoder restores data using meta-information comprising data location information to identify a region the divided data belongs to from among the data.

5. A data reception method, comprising:
    capturing one or more visual codes that are each displayed during at least a minimum expression time and respectively correspond to divided data parts, wherein the visual codes comprise type recognition information to identify the visual codes as a sequential type or a nonsequential type; and restoring data by decoding the one or more visual codes, and extracting and combining the divided data parts included in the one or more visual codes according to visual code type.

6. The method of claim 5, wherein in response to the visual codes comprising type recognition information to identify the visual codes as a sequential type, the restoring of the data comprises restoring the data using a start code to identify a start of the encoded data, data codes to transmit data, and an end code to identify an end of the encoded data.

7. The method of claim 5, wherein in response to the visual codes comprising type recognition information to identify the visual codes as a nonsequential type, the restoring of the data comprises restoring the data using data meta-information comprising data location information to identify a region the divided data belongs to from among the data.

* * * * *